United States Patent [19]

Yoda et al.

[11] 4,400,435

[45] Aug. 23, 1983

[54] MAGNETIC RECORDING MEDIUM

[75] Inventors: Kuniichi Yoda; Takehisa Ohkawa; Hitoshi Azegami, all of Tokyo, Japan

[73] Assignee: TDK Electronics Co., Ltd., Tokyo, Japan

[21] Appl. No.: 283,549

[22] Filed: Jul. 15, 1981

[30] Foreign Application Priority Data

Jul. 22, 1980 [JP] Japan .................................. 55-99398

[51] Int. Cl.³ .................... G11B 5/68; B32B 27/30; B32B 27/40
[52] U.S. Cl. ............................. 428/425.9; 252/62.54; 360/134; 360/135; 360/136; 428/692; 428/694; 428/695; 428/900; 427/128
[58] Field of Search ............... 428/692, 694, 695, 900, 428/425.9; 427/128; 360/134, 135, 136; 252/62.54

[56] References Cited

U.S. PATENT DOCUMENTS 4,256,852  3/1981  Naruse et al. ........................ 427/178
4,352,859  10/1982  Yoda ................................. 428/425.9

FOREIGN PATENT DOCUMENTS 53-9841   4/1978  Japan .................................. 427/128
55-5170   2/1980  Japan .................................. 427/128
55-84033  6/1980  Japan .................................. 427/128
55-73929  6/1980  Japan .................................. 478/692

Primary Examiner—Ellis P. Robinson
Attorney, Agent, or Firm—Oblon, Fisher, Spivak, McClelland & Maier

[57] ABSTRACT

A magnetic recording medium comprises a substrate coated with a magnetic layer comprising a magnetic powder and a binder comprising an urethane resin and a vinyl chloride-vinyl acetate-maleic acid copolymer having a content of maleic acid component of at least 1.5%.

6 Claims, 1 Drawing Figure

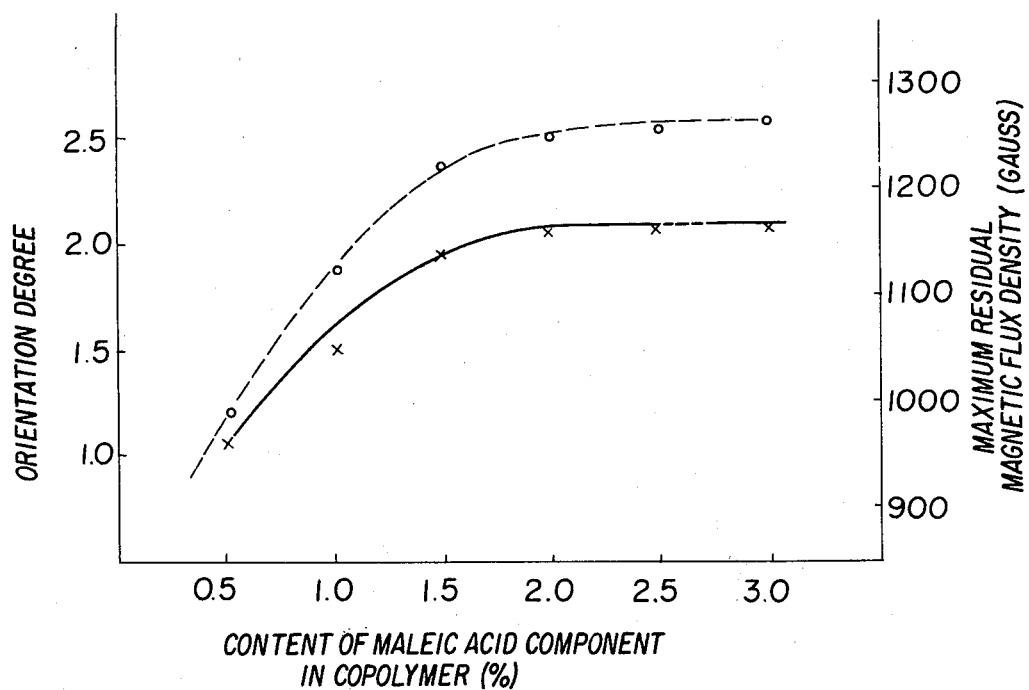
F I G. 1

MAGNETIC RECORDING MEDIUM

BACKGROUND OF THE INVENTION

1. Field of the Invention

The present invention relates to a magnetic recording medium having improved orientation degree and maximum residual magnetic flux density. More particularly, it relates to a magnetic recording medium comprising vinyl chloride-vinyl acetate-maleic acid copolymer having a content of maleic acid component of at least 1.5% as a component of a binder for a magnetic layer.

2. Description of the Prior Arts

The magnetic recording media such as magnetic tapes and magnetic cards are usually prepared by forming a magnetic layer on a substrate such as a film made of polyvinyl chloride, polyester or polycarbonate by bonding a magnetic powder such as $\gamma$-$Fe_2O_3$ with a binder. Various magnetic recording media have been proposed.

Recently, higher characteristics as improvement of electromagnetic convertible characteristic and higher recording density have been further required depending upon an increase of fields of usages of such magnetic recording media.

Certain vinyl chloride type copolymers have been used as the binder for this purpose. Vinyl chloride-vinyl acetate copolymers have been usually used because of high miscibility to a rubber type binder and high dispersibility. However, the vinyl chloride-vinyl acetate copolymers have not a functional group whereby it is not easy to improve dispersibility of the magnetic powder in the magnetic layer and it is not easy to react it by a thermosetting reaction. It has been proposed to use vinyl chloride-vinyl acetate-vinyl alcohol copolymers instead of the vinyl chloride-vinyl acetate copolymers. Because of hydroxyl groups in the copolymer, the dispersibility to the magnetic powder is improved and the thermosettable reaction is performed. However, because of vinyl alcohol component, a glass transition point of the copolymer is disadvantageously high to be difficult for improving surface property by a calender processing.

SUMMARY OF THE INVENTION

It is an object of the present invention to provide a magnetic recording medium having improved orientation and maximum residual magnetic flux density.

The foregoing and other objects of the present invention have been attained by providing a magnetic recording medium which comprises a substrate coated with a magnetic layer comprising a magnetic powder and a binder comprising an urethane resin and a vinyl chloride-vinyl acetate-maleic acid copolymer having a content of maleic acid component of at least 1.5%.

BRIEF DESCRIPTION OF THE DRAWINGS

The FIGURE is a graph showing difference of characteristics of the magnetic recording medium of the present invention and the conventional magnetic recording medium.

DETAILED DESCRIPTION OF THE PREFERRED EMBODIMENTS

It has been studied to incorporate functional groups in the vinyl chloride-vinyl acetate type copolymer for the magnetic recording medium without a deterioration of excellent dispersibility of the vinyl chloride-vinyl acetate type copolymer under preventing higher glass transition point. As a result, it is found the fact when maleic acid component is incorporated in the vinyl chloride-vinyl acetate type copolymer at a ratio of at least 1.5%, the dispersibility to the magnetic powder is excellent, the glass transition point is not substantially increased and the copolymer can be used as a thermosettable binder. Since the maleic acid coponent having carboxylic acid group is incorporated at a ratio of at least 1.5%, even though any polyisocyanate is not added to use it other than a thermosettable binder, the dispersibility to the magnetic powder is excellent and the orientation degree and maximum residual magnetic flux density of the magnetic recording medium are improved.

The present invention has been attained by the finding.

In one embodiment of the present invention, a magnetic recording medium is prepared by forming a magnetic layer on a substrate by bonding a magnetic powder with a binder comprising an urethane resin such as urethane elastomer or prepolymer and a vinyl chloride-vinyl acetate-maleic acid copolymer having a content of maleic acid component of at least 1.5%. In the other embodiment, a magnetic recording medium is prepared by forming a magnetic layer on a substrate by bonding a magnetic powder with a binder comprising the urethane resin and the vinyl chloride-vinyl acetate-maleic acid copolymer together with a polyisocyanate.

In the present invention, it is important to use the vinyl chloride-vinyl acetate-maleic acid copolymer having a content of maleic acid component of at least 1.5% as one of the components of the binder. When the content of maleic acid component is less than 1.5%, the orientation degree and maximum residual magnetic flux density of the magnetic recording medium are remarkably inferior. Such products are not suitable for the practical use.

In the present invention, a content of the vinyl chloride-vinyl acetate-maleic acid copolymer is in a range of 20 to 90% based on a total of the components of the binder.

The vinyl-chloride-vinyl acetate-maleic acid copolymer preferably comprises 20 to 95% of vinyl chloride component, 80 to 5% of vinyl acetate component and 1.5 to 5.0% of maleic acid component.

The urethane resins combined with the vinyl chloride-vinyl acetate-maleic acid copolymer include high molecular weight urethane elastomers having no free isocyanate group and low molecular weight urethane prepolymers having free isocyanate groups. In the present invention, commercially available urethane resins can be effectively used. The typical commercial urethane resins include "Nippolan 2304", "Nippolan 3022", "Nippolan 5032", "Nippolan 5033" and "Paraplen 22S" manufactured by Nippon Polyurethane Co. and "Esten 5702", "Esten 5703", "Esten 5711", "Esten 5712" and "Esten 5715" manufactured by B. F. Goodrich Co.

"CRISBON 4216", "CRISBON 4407" and "CRISBON 7209" manufactured by Dainippon Ink and Color Co.

The typical commercial urethane prepolymers include "Colonate 4080", "Colonate 4090", and "Colonate 4095" manufactured by Nippon Polyurethane Co. and "Takenate L-1007" and "Takenate L-1006" manufactured by Takeda Yakuhin Kogyo Co.

In the present invention, when a polyisocyanate is incorporated in the binder to use a thermosettable binder, the polyisocyanate is preferably added at a ratio of 10 to 25% especially about 20% based on the total of the resins to crosslink them. The typical commercial polyisocyanates include "Colonate L", "Colonate HL" and "Colonate 2036" manufactured by Nippon Polyurethane Co.

The magnetic powders, the additives and the substrates are described in many patents and patent applications filed by the applicant. The descriptions of these details are referred in the understanding of the present invention.

The present invention will be further illustrated by certain examples and references which are provided for purposes of illustration only and are not intended to be limiting the present invention.

EXAMPLE 1

| | |
|---|---|
| Magnetic powder ($\delta$-$Fe_2O_3$) | 120 to 200 g. |
| Vinyl chloride-vinyl acetate copolymer (content of maleic acid component) (of 0 to 3.0%) | 24 to 36 g. |
| Urethane elastomer or prepolymer | 4 to 16 g. |
| Dispersing agent | 1.2 to 7 g. |
| Additive | 0.4 to 4 g. |

EXAMPLE 2

| | |
|---|---|
| Magnetic powder (Co-adsorbed $\delta$-$Fe_2O_3$ or $\delta$-$Fe_2O_3$) | 120 to 200 g. |
| Vinyl chloride-vinyl acetate copolymer (content of maleic acid component) (of 0 to 3.0%) | 12 to 28 g. |
| Urethane elastomer or prepolymer | 12 to 28 g. |
| Polyisocyanate | 4 to 10 g. |
| Dispersing agent | 0 to 7 g. |
| Additive | 0 to 2 g. |

Each magnetic powder composition was prepared by using the components as the formulations of Examples and was coated on a substrate to prepare each magnetic recording medium.

The characteristics of the samples of Example 1 are shown in FIG. 1, wherein the full line shows the orientation degrees and the dotted line shows the maximum residual magnetic flux densities. The following fact is found in FIG. 1.

When the content of maleic acid component is at least 1.5%, the orientation degree is not less than 1.90 and the maximum residual flux density is not less than 1.220 gauss. When the content of maleic acid component is upto 1.0%, the orientation degree is upto 1.50 and the maximum residual flux density is upto 1.120 gauss.

In Example 2, the magnetic powder composition was prepared by using the thermosettable binder. When the Co-adsorbed $\gamma$-$Fe_2O_3$ ("AVILYN" manufactured by TDK) was used as the magnetic powder, and the content of maleic acid component is at least 1.5%, the orientation degree is not less than 2.30 and the maximum residual magnetic flux density is not less than 1.550 gauss. When the content of maleic acid component is upto 1.0%, the orientation degree is upto 1.85 and the maximum residual flux density is upto 1,300 gauss.

Two kinds of commercially available vinyl chloride-vinyl acetate-maleic acid copolymers having a content of maleic acid component of 1.0% were respectively used. The orientation degrees and the maximum residual magnetic flux densities of the resulting magnetic recording media are substantially the same.

In the examples, $\gamma$-$Fe_2O_3$ or Co-adsorbed $\gamma$-$Fe_2O_3$ was used as the magnetic powder. $Fe_3O_4$ or Co-adsorbed $Fe_3O_4$ can be used as the magnetic powder instead of the above-mentioned magnetic powder.

The additives can be the conventional additives such as fatty acids (myristic acid, palmitic acid, stearic acid, behenic acid), silicone oil (dimethyl siloxane) and antistatic agents (metallic soaps and quaternary ammonium salts). The dispersing agents can be the conventional ones such as fatty acid esters, phosphoric acid esters and higher alcohols.

We claim:

1. A magnetic recording medium which comprises a substrate coated with a magnetic layer comprising a magnetic powder and a binder comprising an urethane resin and a vinyl chloride-vinyl acetate-maleic acid copolymer having a content of maleic acid component of at least 1.5%.

2. The magnetic recording medium according to claim 1 wherein said urethane resin is an urethane elastomer.

3. The magnetic recording medium according to claim 1 wherein said urethane resin is an urethane prepolymer.

4. The magnetic recording medium according to claim 1, 2 or 3 wherein said binder further comprises a polyisocyanate.

5. The magnetic recording medium according to claim 1 wherein said vinyl chloride-vinyl acetate-maleic acid copolymer comprises 20 to 95% of vinyl chloride component; 80 to 5% of vinyl acetate component; and 1.5 to 5.0% of maleic acid coponent.

6. The magnetic recording medium according to claim 1 wherein said vinyl chloride-vinyl acetate-maleic acid copolymer is incorporated at a ratio of 20 to 90 wt.% based on said binder.

* * * * *